(12) United States Patent
Allan

(10) Patent No.: US 12,249,149 B1
(45) Date of Patent: Mar. 11, 2025

(54) AUTOMATED VIDEO PRODUCTION OF COMBAT SPORTS EVENTS

(71) Applicant: Jbbr Technologies ApS, Copenhagen (DK)

(72) Inventor: Svejstrup Nielsen Allan, Grindsted (DK)

(73) Assignee: Jabbr Technologies ApS, Copenhagen (DK)

( * ) Notice: Subject to any disclaimer, the term of this patent is extended or adjusted under 35 U.S.C. 154(b) by 0 days.

(21) Appl. No.: 18/376,737

(22) Filed: Oct. 4, 2023

(51) Int. Cl.
*G06V 20/40* (2022.01)

(52) U.S. Cl.
CPC .............. *G06V 20/47* (2022.01); *G06V 20/42* (2022.01); *G06V 20/49* (2022.01)

(58) Field of Classification Search
CPC ......... G06V 20/47; G06V 20/49; G06V 20/42
USPC ........................................................ 386/278
See application file for complete search history.

(56) References Cited

U.S. PATENT DOCUMENTS

| | | | | |
|---|---|---|---|---|
| 2014/0245367 A1* | 8/2014 | Sasaki | ................ | H04N 21/2343 725/109 |
| 2015/0350747 A1* | 12/2015 | Jackson | ................ | G06V 20/47 725/38 |
| 2017/0157512 A1* | 6/2017 | Long | ........................ | A63F 13/86 |
| 2019/0289359 A1* | 9/2019 | Sekar | .................. | H04N 21/4333 |
| 2022/0129669 A1* | 4/2022 | Devassy | ................ | G06V 40/10 |
| 2022/0156503 A1* | 5/2022 | Swaminathan | .......... | G06N 3/08 |

FOREIGN PATENT DOCUMENTS

WO    WO-2020199303 A1 * 10/2020 ......... G06K 9/00744

OTHER PUBLICATIONS

18376737_2023-11-27_WO_2020199303_A1_M.pdf (Year: 2020).*

* cited by examiner

*Primary Examiner* — Loi H Tran
(74) *Attorney, Agent, or Firm* — MARSHALL, GERSTEIN & BORUN LLP

(57) ABSTRACT

A computer-implemented method is provided for automated fight and sparring video production for combat sports events. Images of a ring, mat, cage or other combat sports field of play are captured by means of a video camera system producing a video stream which is digitally processed to identify the area of interest to a viewer. The moving area of interest is automatically detected for each camera, and the quality of view is quantified. The relative positional aspects of the two combatants and the referee are used to determine quality of view, and may be used to shift view in a multi camera setup to enhance the viewing experience. Fight statistics such as punches, kicks, take-downs, etc. may be detected and used to improve the viewer experience by adding stats and highlights to the automated video production.

15 Claims, 9 Drawing Sheets

AUTOMATED VIDEO PRODUCTION OF COMBAT SPORTS EVENTS

TECHNICAL FIELD

The present disclosure generally relates to the field of video processing technology and, more specifically, the automation of video production for combat sports events, such as boxing, mixed martial arts (MMA), wrestling, kickboxing, taekwondo, Brazilian jiu jitsu (BJJ), and the like. The invention is designed for automated and/or computer-assisted production of video streams that capture the fights within combat sports venues, such as rings, cages, mats, and the like. The invention is further applicable for purposes including, but not limited to, refereeing assistance systems, fight analytics, and statistics.

BACKGROUND

In the field of video production, particularly for combat sports events, multiple cameras capturing the same event from different viewpoints are often used to provide comprehensive coverage. Conventional methods of processing the multiple video sequences are typically based on manual intervention, posing a significant challenge for both real-time and post-event video production tasks. Typically, producing an engaging output video sequence from multiple input video sequences involves manual panning, tilting, and zooming of multiple cameras, video switching based on the director's choice, and considerable post-production work to pick the best shots, remove redundant sequences, and edit the video into a coherent and engaging form.

In other words, video production for combat sports events traditionally requires significant manual work by camera operators, technical crews, production control staff, as well as specialized equipment. Given the human and financial resources involved, such professional-grade productions are usually limited to large-scale events with sizable budgets, but are unfeasible for smaller tournament events, gym fight nights, or routine sparring sessions.

Further, the conventional process is highly subjective and heavily reliant on the skill level of the director or video editor. Thus, it does not guarantee a perfectly sequenced video, as real-time decisions might not always result in the best viewpoint selection. In addition, the identification of highlight scenes from combat sports events, which usually involve significant actions such as punches, kicks, or takedowns, is typically performed manually. Such a process is not only tedious but can also be prone to overlooking vital parts of the event.

Although consumer cameras and smartphones offer a cost-effective alternative for capturing footage, they lack the capability to autonomously follow the fast-paced action in a fight, as well as the capability to add stats and round highlights that are important aspects of the viewing experience. In addition, fights and highlights are best captured when cameras are available from multiple angles to allow for switching to whichever angle offers the best viewing experience at a given moment.

Therefore, there is a need for automated methods to handle the complexities associated with creating engaging and viewer-preferred video sequences of combat sports events.

Despite the substantial advances in the field of video production and processing, there remains a need for further improvements and innovation, particularly in the automation and optimization of video production for combat sports events. This context provides the backdrop for the present disclosure.

It is therefore a technical problem underlying the present invention to provide a method of automated video production for combat sports events, thereby overcoming the above-mentioned disadvantages of currently available solutions at least in part.

SUMMARY OF THE INVENTION

The problem is solved by the subject-matter defined in the independent claims.

Advantageous modifications of embodiments of the invention are defined in the dependent claims as well as in the description and the figures.

According to a first aspect of the present invention, a method of automated video production for combat sports events is provided. The method may be computer-implemented. The method may comprise receiving at least one input video sequence of a combat sports event captured by at least one video camera. The method may comprise processing the at least one video sequence. The step of processing may include automatically determining at least one region of interest in the video sequence. The automatic determining may be performed by an object detection algorithm, in particular a machine learning based object detection algorithm. The at least one region of interest may be associated with a first combatant of the combat sports event, preferably with at least one body part of the first combatant. The step of processing may include automatically determining a quality-of-view indicator of the at least one determined region of interest. The automatic determining of the quality-of-view indicator may be based at least in part on a positional relationship between the first combatant and a second combatant of the combat sports event. The method may include generating an output video sequence based at least in part on the determined quality-of-view indicators.

Alternatively or additionally to the automatic determining of the quality-of-view indicator being based at least in part on a positional relationship between the first combatant and a second combatant of the combat sports event, the automatic determining of the quality-of-view indicator may be based at least in part on a positional relationship between at least one of the first and second combatants and a referee. Alternatively or additionally, automatic determining of the quality-of-view indicator may be based at least in part on a positional relationship between at least one of the first and second combatants and the respective video camera capturing the respective video sequence. Alternatively or additionally, automatic determining of the quality-of-view indicator may be based at least in part on a positional relationship between the referee and the respective video camera capturing the respective video sequence. Alternatively or additionally, automatic determining of the quality-of-view indicator may be based at least in part on a positional relationship between body parts of the first combatant and/or between body parts of the second combatant.

It is preferred that the automatic determining of the quality-of-view indicator may be based at least in part on a positional relationship between the first combatant and a second combatant of the combat sports event, and further on a positional relationship between at least one of the first and second combatants and the respective video camera capturing the respective video sequence. It is even more preferred that the automatic determining of the quality-of-view indicator may be based at least in part on a positional relationship between the first combatant and a second combatant of the combat sports event, and further on a positional relationship between at least one of the first and second combatants and the respective video camera capturing the respective video sequence, and further on a positional relationship between body parts of the first combatant and/or between body parts of the second combatant.

A combat sport, or fighting sport, should be understood as a contact sport that usually involves one-on-one combat. The combat sports event may in particular be a boxing event. Other combat sports events for which the method may be used, are mixed martial arts (MMA), wrestling, kickboxing, taekwondo, Brazilian jiu jitsu (BJJ), and the like.

In a combat sports event, a setting aligned with the sports rules and regulations often comprises a designated area of action, which may be referred to as the ring or combat area. Contained within the ring or combat area, there are combatants being the participants of the combat sports event. Usually, two or more combatants are involved having the purpose to contest against each other. Each combatant is an active participant involved in physical actions with respect to one another. The combatants may execute movements and/or techniques in adherence with their training, strategic intentions, and the guidelines set by the respective combat sports.

In addition to the combatants, another entity within this setting may be a referee who may be assigned to regulate the combat sports event, i.e., combat actions of the combatants. The role of the referee may include observing, making decisions based on combat actions, enforcing sports rules, cautioning or penalising combatants for violations, and/or maintaining the fair and safe execution of the combat sports event. In cases of physical extremities or abrupt eventualities, the referee may invoke their authority to introduce breaks, cease the ongoing contest, declare outcomes and/or ensure the safety of the combatants.

Each of the participants of a combat sports event, i.e., the combatants and the referee, may be subject to a region of interest. As described in further detail below, a region of interest may thus for example be a combatant or referee as such, or a body part of a combatant or referee. In particular, the following examples of body parts may be relevant: A combatant's "fist", that may be protected by gloves in disciplines like boxing, serves as one of the primary contact points for performing combat actions against the counterpart combatant. A combatant's "forearm" and/or "elbow" are frequently involved in various combat actions of combat sports events, in particular for blocking incoming punches or initiating offensive moves. Lower body parts of a combatant, such as the "foot" and/or "shin" and/or "knee", are also relevant in various combat sports events, either as body parts onto which punches are not allowed, or as body parts which are used for combat actions, e.g., in kicking-based combat sports such as taekwondo or kickboxing. A combatant's "head" may also become a point of offensive or defensive combat actions in certain combat sports, like boxing. A combatant's "torso", that may include the chest and/or abdomen regions of a combatant, often is relevant as a preferred target area for punches. Further, in various different combat sports, such as in grappling sports like judo or wrestling, more additional body interactions may be relevant, e.g., involving a combatant's "shoulders", "hips", "feet" and/or the like for throwing or pinning a respective counterpart combatant.

The method may include receiving of a minimum of one video sequence from the combat sports event. The capturing of this input video sequence is facilitated, in particular performed, by one or more video cameras that may be positioned strategically around the combat area to ensure maximum coverage, thereby allowing for well-rounded input data for analysis. In other words, the method may be carried out using at least one video camera building an aspect of the hardware setup, wherein the hardware setup may further include computational means performing several steps ensuring a thorough analysis of the video sequence (s) and high-quality output generating an improved viewer experience. For instance, one or more of the method steps according to the present invention may be performed by a server and/or cloud platform and/or a local computer being placed in the nearfield of the combat sports event and/or by any other suitable computational means.

The term "video camera" may be understood as an imaging device being configured to capture a scene generating a video sequence. In particular, the video camera may be configured to capture sequences of images, which in fast succession create the effect of motion and thus a video sequence. Depending on the viewpoint of the video camera, captured video sequences include scenes of action during combat sports events, recording movement(s), expression (s), and/or the like involving an angle of view and a zoom factor of the video camera. A video camera may be equipped with advanced technology such as autofocus, image stabilization, high-definition capture ability, along with a range of frame rate options for versatile capturing.

The term "viewpoint" may be understood as a location of a respective video camera relative to the combat area or ring, preferably including a respective angle of view, more preferably a respective zoom factor and/or further settings of the respective video camera. Thus, in other words, the viewpoint of a video camera may include positioning and/or orientation of a respective video camera and optionally other settings of the respective video camera.

The term "video sequence" may essentially be a collection of successive video frames or images that, when played back, convey motion. In the nearby chronology of images that make up a video sequence, each image may be termed as a frame. The sequence of these frames captured by the video camera may encapsulate not just the physical action ongoing in the combat sports event but also the fleeting dynamics and interplay between the combatants. It may comprehensively capture the progress of the combat, including punches landed, responsive dodges, the behavior of the referee, the behavior of the crowd, and the entire match ambiance. A single video sequence can range over varying lengths, e.g., influenced by the purpose for which the sequence is to be analyzed.

The term "computer-implemented" refers to computational means, i.e., to the use of computer systems or digital technology to execute certain tasks or processes. In the context of the present invention, it pertains to the deployment of a set of algorithms and/or applications and/or digital tools used by a computer to carry out the method's objectives. Thus, computational means may be involved in various stages of the method, e.g., from the initial reception of the video sequences, to the processing and analysis of these sequences, through to the final output generation. In particular, the computational means may include, but are not limited to, object detection which may be used to determine regions of interest in a video sequence and/or machine learning techniques that may be used to interpret the interactions regions of interest, and/or video editing used to compile and output a desired video sequence.

The term "object detection algorithm" may be understood as a computational process employed for recognizing instances of objects' existence in images or frames of a video sequence, in particular for recognizing regions of interest. It may be a computer program or set of instructions that enables a computer system to distinguish and/or locate certain objects, from a bulk of perhaps otherwise unsorted visual data. An object detection algorithm, as it may be implemented in the context of the present invention, may work by scanning a video sequence and identifying segments where a predetermined "object", in particular "region or interest", is found. Examples may include a combatant of the combat sports event, a referee of the combat sports event, and/or body parts of said combatant and/or referee. An object tracking algorithm may analyze images or frames of the video sequence to determine visual patterns and/or characteristics that align with possible pre-set definitions of the object and/or region of interest.

In a more advanced implementation, an object detection algorithm could be machine learning based, which means it learns and/or evolves and/or is pre-trained from a training data set to recognize objects and/or regions of interest. Through learning from training data, the machine learning based algorithm is capable of predicting and/or recognizing objects and/or regions of interest in new, never-before-seen video sequences. Further, an object detection algorithm could be configured to track multiple objects and/or regions of interest simultaneously, detect object overlapping, recognize occlusion, and/or even categorize the detected objects and/or regions of interest into different classes. These comprehensive capabilities of object detection algorithms may contribute to the efficiency and reliability of the method according to the present invention.

The term "machine learning" may be understood as a subset of artificial intelligence that involves the construction of algorithms that allow computer systems to learn from and make predictions or decisions based on data. One form of machine learning models that may be applied in the present invention is supervised learning models. These models, trained on a labelled dataset, can be utilized in determining regions of interest. For instance, a Convolutional Neural Network (CNN), popular in image analysis tasks, can be employed to detect and localize the combatants or specific body parts in each frame of the video sequence. Alternatively or additionally to supervised learning models that require a labelled dataset, unsupervised learning models, such as clustering algorithms and/or autoencoders, can be used to uncover hidden and/or occluded patterns or structures from unlabeled data. In the context of the invention, these can be employed to learn and model the normal behavior or movement patterns of the combatants and detect anomalies based on deviations from the normal. Alternatively or additionally, semi-supervised learning models may be used, which combine the principles of both supervised and unsupervised learning. Given the large volumes of video data, labelling every frame can be a daunting task. Semi-supervised learning models can learn from a relatively small set of labelled data and a large set of unlabelled data, thereby increasing the efficiency of the training process. Alternatively or additionally, reinforcement learning models may be used. These models learn how to act based on feedback or reward signals. They could be used to train the object detection algorithm or the determination of the quality-of-view indicator, by learning from trial and error the best parameters or methods that maximize the viewer's satisfaction or engagement. Furthermore, Deep Learning models, which are a subset of machine learning representing complex, hierarchical data abstractions, could also be applied. For example, Recurrent Neural Networks (RNN) or Long Short-Term Memory (LSTM) networks, which are effective in dealing with sequential data, could be employed to analyze the sequences of movements of the combatants across the frames. The machine learning model may be designed as a classifier. By using a machine learning model, steps of the method may be performed with higher accuracy and efficiency.

It may be provided that the object tracking algorithm is based on a machine learning model which is trained by supervised machine learning or semi-supervised machine learning model, wherein the training data is a pre-labelled dataset. The training data may represent the foundational knowledge for the machine learning model comprising a collection of instances, each labelled with relevant labels and/or categories that describe the aspects of interest, e.g., for a video sequence and/or for a region of interest. The training data may encompass a database of video sequences from combat sports events being labelled with relevant information, e.g., frame by frame. For example, relevant objects and/or regions of interest may be labelled, which could be the combatants, the referee or particular body parts of the combatants or referee, such as head, fists, feet and others.

The fundamental design of the machine learning model, as described above including various implementation options, is self-evidently mutatis mutandis applicable to all other machine learning models mentioned in the following disclosure of the present invention.

The term "region of interest" may be understood as a selected subset or area within an entire dataset that is the focus for further analysis or processing. In the context of video processing and specifically for this invention, a region of interest in a video sequence may refer to those segments of the video sequence where a particularly relevant object, such as a combatant, a referee and/or one or more body parts of those are located, and/or where particularly relevant actions relating to the combat sports event occur. Given the dynamic character of combative sports events, regions of interest may move within a video sequence and are preferably to be followed within a video sequence. In other words, regions of interest may be defined variably over time and space. For example, during a boxing match, if a region of interest is determined to be around a boxer's fist, it would continually change in both position and size as the first moves and changes shape throughout the match. Thus, a region of interest may be a cropped view of a video sequence, i.e., a section of video image frames.

In combat sports, one of the significant challenges that can influence the quality and clarity of video sequences is occlusion. The term "occlusion", in video processing and object detection, refers to the partial or complete obstruction of one object in a video sequence by another object. This phenomenon may occur, in a combat sports event, in particular when the combatants overlap each other or a particular body part in the video sequence, resulting in obstructed views from certain camera viewpoints. Also, this phenomenon may occur if different body parts of one of the combatants overlap each other, i.e., causing self-occlusion. This is mainly due to the combatants being in constant movement, at close quarters, engaging in offensive or defensive combat actions. The occlusion may vary based on the relative positioning of the combatants, in particular relative to each other, and the viewpoint of the respective video camera. In some cases, when combatants are side-by-side, one may completely block the other from certain camera angles. In other cases, when combatants counteract each other's moves, a body part like a first may obscure the view of the other combatant's body portion, causing partial occlusion. Occlusion in combat sports poses significant challenges when applying video processing and/or object detection.

The term "quality-of-view indicator" is to be understood in the context of occlusion, as described above. Thus, the quality-of-view indicator may essentially quantify the probable content quality of a region of interest in a video sequence. The content quality may be closely connected to the overall relevance of the region of interest in a respective video sequence thus indicating if a corresponding video sequence should be included in the output video sequence. Also, the content quality max be closely related to the degree of occlusion and/or self-occlusion, as described above. For example, an occlusion may occur if the referee is blocking the view of a respective video camera and/or if the angle with which the combatants are positioned relative to the respective video camera is not optimal. An angle where the side of each fighter is visible in a video sequence may typically comprise a higher quality of view that an angle where the front of one combatant and the back of the other combatant is visible. An aspect that may indicate whether occlusion is apparent or not, may be an angle between a line virtually drawn from a respective video camera position to the mid-point of a virtually drawn line defined between the center of mass of each combatant. If the angle at which those two lines intersect is 0°, the quality-of-view may be low, whereas 90° may indicate a view angle having a high quality-of-view. In conjunction with this, to put it in different words more relying on a viewer, the quality-of-view indicator may reveal the degree of viewer interest that a region of interest of a respective video sequence is expected to gain.

The quality-of-view indicator may be a binary value which may be 0 or 1, or may be a value defined within a predetermined scale ranging from, e.g., 0 to 1, or may be any other suitable value including the relevant information about the quality of view. In case if the quality-of-view indicator is a value within a range, a threshold may be defined which builds the boundary between "usable" and "not usable" quality-of-view indicator values. Thus, indirectly or directly, the quality-of-view indicator may carry, in particular quantify, information about the degree of occlusion.

One aspect contributing to determining a quality-of-view indicator is the positional relationship between a first combatant and a second combatant of the combat sports event. More specifically, the positional relationship may be based on the angle of view with respect to a virtual line drawn between the body mass centers of the two combatants. If this angle measures 90°, the view captures a side-to-side perspective of the combatants and of the combat actions. Thus, in this case, minimal occlusion obstructing the view occurs, the visualization and tracking of movements may be generally clear and detailed, resulting in visibility for viewers. This may correspond to a high value of the quality-of-view indicator.

Conversely, if the angle measures 0°, the view aligns directly behind or in front of the combatants. Consequently, one combatant may heavily occlude the other, obscuring the view of their movements, actions and expressions to a significant extent. This lack of visibility may correspond to a lower value of the quality-of-view indicator. Thus, even if a relevant combat action takes place, the quality-of-view is likely to be not good enough to include the respective scene of a region of interest of a respective video sequence in the output video sequence.

The combination of determining regions of interest and determining quality-of-view indicators for the regions of interest, is particularly advantageous. With an appropriate determination of regions of interest, most interesting body parts, like combatants' fists in boxing fights, are selected and thus, accordingly the relevant combat actions, like throwing a punch, are determined. With an appropriate determination of quality-of-view indicators for the determined region of interests in the video sequence(s), a rating for the quality is determined expressing how good the respective region of interest is visible in the respective video sequence. For better understanding purposes, it is mentioned at this point, valid for the entire disclosure of the present invention, that a region of interest of a video sequence can be a sub-sequence of the video sequence, which contains the region of interest. In particular, such a sub-sequence may comprise a section of the video images or frames and/or a temporal section of the video sequence.

The approach introduced by the present invention brings with it a multitude of technical advantages, providing a revolutionary impact on video production for combat sports events.

Initiating with the reception of, at least, one input video sequence of a combat sports event recorded by at least one video camera, the method takes its first steps towards the precise processing of the combat sports event. This flexibility in handling either a singular or multiple video inputs extends the invention's capability in capturing diversified views, providing a comprehensive coverage of the event.

In the case when a plurality of video sequences is received, the method may comprise synchronizing the plurality of video sequences. Synchronizing may be performed based on combat activities, in particular occurring in regions of interest. Alternatively or additionally, synchronizing may be performed based on audio time offset determination between video sequences captured by different video cameras. Time audio time offset determination is an efficient approach requiring relatively low processing resources.

During processing the video sequence or sequences, the automation of the method offers a notable advantage. The preferably machine learning-based object detection algorithm operates automatically, replacing manual tracking and detection with a more robust, efficient, and precise alternative. It determines regions of interest linked to the first combatant involved in the event, even focusing on specific body parts, if necessary. This advanced object detection holds significant potential in capturing and highlighting the action-packed moments in combat sports, enhancing the delivery of the sporting narrative. Another important advantage provided by this method relates to the automatic determination of the quality-of-view indicator. The quality-of-view indicator helps to quantify the degree of occlusion and thus the potential viewer interest that a particular segment of the video sequence may generate. With the positional relationship between the first and the second combatant as a contributing factor, these indicators take into account the spatial dynamics inherent in combat sports that heavily influence viewers' engagement, in particular the occlusion phenomenon as described above.

The angle of view plays a crucial role in this determination and may also be performed based on a machine learning model. In cases where the angle aligns the viewer directly towards the combat action between the combatants, the quality of view is optimized, leading to better visibility of the event and lesser occlusion. Conversely, an obstructed view, heavy with occlusion, lowers the quality of view. With the automated determination of the quality-of-view indicator, the method can intelligently guide the automated editing process. The key moments can be selected and highlighted, effectively translating the thrill of combat sports to the viewers.

Subsequently, having absorbed and analyzed the input video sequence's crucial aspects, the method proceeds to generate an output video sequence. This sequence is refined, with its selection and arrangement of scenes dictated by the determined quality-of-view indicators. Implementing an indicator-based approach results in the production of a video sequence having low occlusion and thus being most likely to captivate and engage viewers. Stringing together the most interesting moments, combined with the analytical insights gained from the machine learning process, weaves an engaging narrative of the combat event.

In sum, this computer-implemented method introduced for the automated video production for combat sports events brings a transformative change in the respective domain. With enhanced and intelligent video processing capabilities, it promises an enriched viewer experience, streamlined production process, while honoring the unpredictability and dynamism inherent in combat sports events.

It may be provided that the at least one input video sequence is a plurality of input video sequences. The step of processing may, in this case, be performed on each of the plurality of video sequences. The plurality of input video sequences may be captured by a plurality of video cameras.

Each of the video sequences may offer a unique view of the event, created by their individual viewpoints, e.g., positions relative to the combat sports event, angles of view and/or zoom factor. The parallel processing of video sequences furnishes a more exhaustive record of the event, leaving fewer blind spots and gauging more nuances of the activities unfolding on the sports grounds. Instead of acting on a singular video camera feed, the object detection algorithm and subsequent method steps of the present invention may engage with each video sequence individually. By doing so, the technology allows for capturing a comprehensive picture of the event from multiple viewpoints, thereby maximizing the value of the output video sequence. This also enables minimizing occlusion in the generated output video sequence.

In particular, parallel processing of more than one video camera feed is advantageous when it comes to determining the positioning and movements of the combatants. In a rapidly evolving event such as a combat sports event, a single moment can make a significant difference in the viewer's understanding and appreciation. With singular video feeds, the opportunities to capture such moments are inherently limited by the given perspective and frame. Moreover, the usage of a plurality of video cameras facilitates a higher level of fault tolerance. In case of a technical glitch, failure, or any other issue with one of the cameras, the system isn't left devoid of data to process; the feed from the remaining cameras continues to provide input, ensuring an uninterrupted performance. Further, using more than one video camera is advantageous in order to improve stability of the method according to the present invention, i.e., shifting the viewpoint of a virtual camera and/or of the generated output video sequence to a video camera having a stable view.

It may be provided that the method is performed based on a plurality of machine learning models, wherein performing the method includes utilizing a sequence of at least two machine learning models, and/or wherein performing the method includes utilizing at least three machine learning models, wherein outputs of at least two of the at least three machine learning models are used as inputs for at least one of the at least three machine learning models.

In the method according to the present invention, the inclusion of multiple machine learning models includes significant enhancements. This inventive approach enables the procedure to leverage the specialized strengths of various machine learning models, resulting in a cooperative, multi-faceted operation at runtime. In particular with the use of a strategic sequence of machine learning models, there arises a unique mosaic of individual model capabilities that collectively improve the method's output quality.

For example, one machine learning model could focus on interpreting the input video sequence to determine regions of interest. This model may be specialised in object detection and tracking, and as such, ensure that the most crucial segments involving the combatants are observed with precision. Another machine learning model may focus on spatial analysis, in order to evaluate the output of the first machine learning model, i.e., to determine the quality-of-view indicators. This model may excel in evaluating occlusion events, strategic angle shifts, camera viewpoints and the like to relay a weighted quality value.

One or more of the machine learning models may be implemented as a classifier. For example, the object detection algorithm may to classify different regions in the video sequence as either being a region of interest or not. A more sophisticated classifier could even categorize the type of object, i.e., body part and/or the like. Additionally or alternatively, a classifier could potentially also contribute to the determination of quality-of-view indicators, classifying them into categories like high, medium, or low, or any other suitable scale, based on certain predefined criteria or thresholds.

The priority in this concept here is on the functionality aiming to have an overall good quality output and at the same time facilitating real-time operation at low processing resources.

Machine learning models can be advantageously selected and sequenced based on their individual and combined competencies. Examples for further machine learning models that may be combined, are given in the disclosure further below.

It may be provided that automatically determining at least one region of interest is performed based on a determining machine learning model.

As described above, the combination of determining regions of interests and quality-of-view indicators is particularly advantageous and provides presents a robust quality-enhancing concept for generating the output video sequence.

The regions of interest, as identified by the object detection algorithm, include the most crucial combat actions of the combat sports event. An example of this is seen in a boxing match, where rapid first movements are of particular relevance. Here, the object detection algorithm would likely demarcate a boxer's first as a region of interest, effectively encapsulating segments of the video sequence where the boxer, being the first combatant in this case, is throwing a punch. This approach ensures that every momentous instance or the most visually engaging action isn't lost in the noise, but rather, is handled with an adequate attention. In conjunction with this, the concept of quality-of-view indicators as a mechanism to grade the regions of interest based on their visibility or lucidity in the respective video sequence, is provided. By scaling the quality-of-view indicators, the system can filter or prioritize the most visible, least occluded moments of action in the final output video sequence, and/or chose one best output video sub-sequence for a particular action from a plurality of input video sequences. For instance, in a boxing match scenario, if the camera angle or the relative positioning of the boxers results in one boxer obscuring the view of the other's punch action, the quality-of-view indicator associated with this punching sequence would likely be low. On the other hand, if the identical punch action occurred with minimal to no occlusion in a different input video sequence, providing clear visibility of the punch in the video sequence, the quality-of-view indicator for this sequence would be higher. This automatically guides the generation of the output video sequence, sequencing it in favor of more visually discernible and relevant combat actions, thereby maximizing the user engagement and appreciation of the combat sports event as well as the objective quality of the output video sequence.

Furthermore, it is important to note, in considering the principles of the present invention, that a region of interest in a video sequence can be a specific sub-sequence of the video sequence. This sub-sequence can comprise sections of video frames or images and can also span over a temporal phase of the video sequence. Thus, the region of interest isn't confined to isolated frames or moments, but can extend to include a collection or sequence of frames that together contribute towards capturing the dynamism and continuity of the combatants' actions. Using a machine learning model for determining the regions of interest and for determining the quality-of-view indicators is particularly advantageous and may provide an enhances quality of output video sequences. On the implementation side, it is possible to include both tasks in one machine learning model. But providing two separate machine learning models for the two tasks, wherein the output of the first machine learning model, e.g., determining the regions of interest, functions as an input for the second machine learning model, e.g., determining the quality-of-view indicators, is particularly advantageous due to processing resources and for facilitating a real-time experience.

It may be provided that prior to processing the video sequences, preprocessing one or more of the at least one video sequence is performed for reducing the processing load that is needed for performing processing, Additionally or alternatively, preprocessing is performed based on a preprocessing machine learning model.

The concept of implementing a preprocessing stage prior to initiating the core video sequence processing introduces several technical advantages. The preprocessing stage may primarily prepare and/or refine the video sequence(s) for the subsequent stages of the method. This can involve activities such as filtering out noise, adjusting lighting or contrast, masking and/or padding irrelevant sections of the sequence, introducing labels to video sequences, marking sections of video sequences as sections of main combat actions, and/or reducing the resolution or frame rate for simplicity. These adjustments assist in reducing redundant and/or irrelevant information, thus streamlining the input that will be processed by the subsequent stages of the method in order to, for example, reduce the need for processing resources.

Enriching the preprocessing with a dedicated machine learning model can further enhance the efficiency of this stage. A preprocessing machine learning model can learn to detect and filter out redundant and/or irrelevant information effectively, identify the relevant sections of the video sequences, and calibrate the input video sequences optimally for the subsequent tasks.

One notable advantage of this setup is the reduction in processing load. It reduces the burden for the remaining stages of the process, providing a well-processable basis for the object detection algorithm and further tasks. Further, reducing computational resources and processing time propels overall efficiency. This advantage becomes particularly valuable for real-time and/or live broadcast scenarios, where the time taken from capture to broadcast needs to be minimized. Further, a preprocessing step can significantly improve the object detection algorithm's performance by providing cleaner, simpler input video sequences, reducing errors and improving accuracy.

It may be further provided that preprocessing includes splitting the video sequences with respect to time sections and/or cropping the video sequences with respect to image sections.

Aspects of splitting and/or cropping of video sequences are highly beneficial. The splitting of video sequences refers to the temporal segmentation of the input data. This would involve dividing the entire length of a video sequence into smaller time sections and/or chunks. Doing so can be incredibly advantageous when dealing with long-duration sporting events, simplifying the handling of video data and optimizing the processing time.

The cropping of video sequences may refer to the spatial segmentation of the input data. Much like cropping a photograph to focus on a particular subject or view, video cropping may involve selecting sections of a video frame that are relevant or of interest, disregarding the rest.

This aids in managing computational resources even more effectively. Working on smaller time sections and focused image sections reduces the volume of data to be processed in each iterative step, thereby requiring less memory and processing power. Further, segmenting by time and space can lead to a significant reduction in processing time.

It may be provided that automatically determining the quality-of-view indicator is performed based on an evaluation machine learning model.

It may be provided that automatically determining a quality-of-view indicator is performed under consideration of a viewpoint of a respective video camera and/or based on relative positional aspects of the combatants and optionally the referee.

As described above, in combat sports events, one of the significant challenges that can influence the quality and clarity of video sequences is occlusion. This phenomenon may occur, in a combat sports event, in particular when the combatants overlap each other or a particular body part in the video sequence, resulting in obstructed views from certain camera viewpoints. The quality-of-view indicator may be determined based on the degree of occlusion and thus under consideration of relative positional aspects of the combatants and optionally the referee. This is particularly beneficial, as described above. The positional relationship may be based on the angle of view with respect to a virtual line drawn between the body mass centers of the two combatants. If this angle measures 90°, the view captures a side-to-side perspective of the combatants and of the combat actions. Thus, in this case, minimal occlusion obstructing the view occurs, the visualization and tracking of movements may be generally clear and detailed, resulting in visibility for viewers. This may correspond to a high value of the quality-of-view indicator. On the other hand, if the angle measures 0°, the view aligns directly behind or in front of the combatants. Consequently, one combatant may heavily occlude the other, obscuring the view of their movements, actions and expressions to a significant extent. This lack of visibility may correspond to a lower value of the quality-of-view indicator.

It may be provided that generating the output video sequence includes determining a viewpoint of a virtual camera based on which the output video sequence is generated. Determining the viewpoint of the virtual camera is preferably performed based on a viewpoint machine learning model, and/or determining the viewpoint of the virtual camera includes one or more of the following: selecting one of the viewpoints of the plurality of video sequences based at least in part on the determined quality-of-view indicators; performing a zoom-in operation or a zoom-out operation, in particular on one or more of the at least one video sequence; performing a crop operation, in particular on one or more of the at least one video sequences. Therefore, for example, a viewpoint of the virtual camera may be a cropped section of a video sequence captured by a video camera.

For example, if the combat sport is boxing, identifying an optimal viewpoint is crucial to effectively capture the quick movements and exchange of punches between the combatants. This process may be performed based on machine learning designed to evaluate the best viewpoint based on variables such as the actions of the combatants, their positions in the ring, the available camera angles, and the quality-of-view indicators, as discussed in more detail above.

Determining the viewpoint of the virtual camera encompasses several potential operations. For instance, this could involve selecting one of several viewpoints from multiple video sequences, i.e., video cameras, based on the determined quality-of-view indicators. This would optimally display a combat action while also providing diverse perspectives on the event. It may ensure that viewers do not miss essential moments during the sports event, which contributes significantly to the viewing experience. Further, this may provide a viewer a more varied and/or interesting experience seeing combat actions from different angles over the course of the combat sports event.

Operations like zoom-in or zoom-out may also be executed on one or more of the video sequences. For instance, during a critical exchange of punches in a boxing match, a zoom-in would allow the viewer to witness the interaction more closely. Conversely, a zoom-out may provide an overview of the boxer's positions and movements, providing additional context. Operations like cropping can further focus on critical events or movements while removing unnecessary elements or surroundings from the video. This provides greater emphasis on the sport's most salient aspects, improving viewer engagement and comprehension.

The method may comprise, prior to generating the output video sequence, determining highlight scene proposals, preferably based on detecting actions such as punches, kicks, take-downs, more preferably based on a relevance evaluation thereof. Additionally or alternatively, the method may comprise, prior to generating the output video sequence, determining combat statistics and/or combat statistic proposals, preferably based on detecting actions such as punches, kicks, take-downs, more preferably based on a relevance evaluation thereof.

Before generating the output video sequence, the method may be configured to determine highlight scene proposals, which serve as pivotal moments in the combat sports event. This aspect of the invention operates by identifying actions such as punches, kicks, take-downs, and applying algorithms to assess their significance to the general narrative of the event. For instance, perfectly executed punches or impressive take-downs provide pivotal moments that can swing the result of a combat sports event. An example would be detecting a knockout punch sequence in a boxing match.

The technology identifies movements indicative of a powerful haymaker leading to a knockout. It then tags this sequence as a highlight scene proposal and prioritizes it during the creation of the output video sequence. Further, the method may also determine combat statistics or proposals for combat statistics. This step aids not only viewers but also sports analysts and commentators who express interest in quantitative measurements of actions within the combat sport. The technology would detect actions such as punches, kicks, take-downs and use this to algorithmically determine combat statistics based on rules and regulations of the respective combat sports. An example of this might involve detection of punching sequences within a boxing match; the invention would track and record the number of punches thrown by each combatant, the percentage of punches landed, frequency and degree of power punches, and so forth. These statistics provide a numerical representation of a combat sports event pace and intensity and can be used for detailed post-match analyses or even live commentary.

It may be provided that the highlight scene proposals are rated based on user preferences, wherein for generating the output video sequence, a selection of highlight scenes is performed. The selection may be performed based on a machine learning model.

The method can incorporate a personalized system where highlight scene proposals are rated based on viewer preferences. This aspect enables viewers to customize the output video sequence according to personal interests and would enable them to view an elongated sequence of their favorite fighter or their preferred moves such as punches, kicks, or take-downs. For example, a viewer might prefer scenes featuring high-intensity exchanges or moments when a particular combatant dominates the match. If so, the system would more favorably rate scenes that align with these preferences, thus tailoring the viewing experience to the individual's taste.

To further facilitate a personalized viewing flow, the method may include selecting the highlight scenes for generating the output video sequence. This selection process may be performed based on a machine learning model. The machine learning model might harness data from several variables—including the user's viewing history, behavior, and explicit preferences—to select just the right combination of scenes. For example, if the viewer frequently rewatches scenes featuring successful uppercuts, the machine learning model may prefer highlight scenes with similar action when generating the output video sequence.

It may be provided that the output video sequence includes at least part of the determined statistics and proposed highlight scenes, wherein the proposed highlight scenes are included in the output video sequences overlay graphics, in particular during breaks of the combat sports event.

The method may facilitate the inclusion of computed statistics in the output video sequence, augmenting the viewing experience with vital data of interest. This ensures that alongside the live progress of the event, viewers have access to insightful statistics without switching between different media. Considering a situation where a boxing match is being the output video sequence, which is broadcasted, during the live combat event, the system may include statistics such as the number of punches thrown, percentage of hits and misses, and power punches landed by each combatant. These numerical figures offer an analytical perspective to the viewers, allowing them to measure the performance in real-time. Similar to the above-described, the selection of statistics may also be performed based on personalized viewer preferences, in particular being performed by a machine learning model.

According to a second aspect of the present invention, a use of at least two machine learning models for performing a method according to the first aspect of the present invention is provided. It may be further provided that an output of at least one machine learning model may be used as an input for at least one different machine learning model.

According to a third aspect of the present invention, a data processing apparatus, preferably a computer device and/or a server and/or a cloud platform, comprising means for carrying out a method according to the first aspect of the present invention, is provided.

According to a fourth aspect of the present invention, a use of a plurality of video cameras in a method according to the first aspect of the present invention is provided. The video cameras may be arranged around a combat sports event.

According to a fifth aspect of the present invention, a system including a plurality of video cameras according to the fourth aspect of the present invention and including a data processing apparatus according to the third aspect of the present invention, is provided, wherein the system is configured to perform a method according to the first aspect of the present invention.

According to a sixth aspect of the present invention, a computer program or a computer-readable medium is provided, having stored thereon a computer program, the computer program comprising instructions which, when the program is executed by a computer, cause the computer to carry out a method according to the first aspect of the present invention.

All features, technical implementation details and advantages described with respect to any one of the aspects of the present invention described herein are self-evidently mutatis mutandis applicable for any one of the other aspects of the present invention and vice versa.

BRIEF DESCRIPTION OF THE DRAWINGS

The disclosure may be better understood by reference to the following drawings.

DETAILED DESCRIPTION

Figure 1:
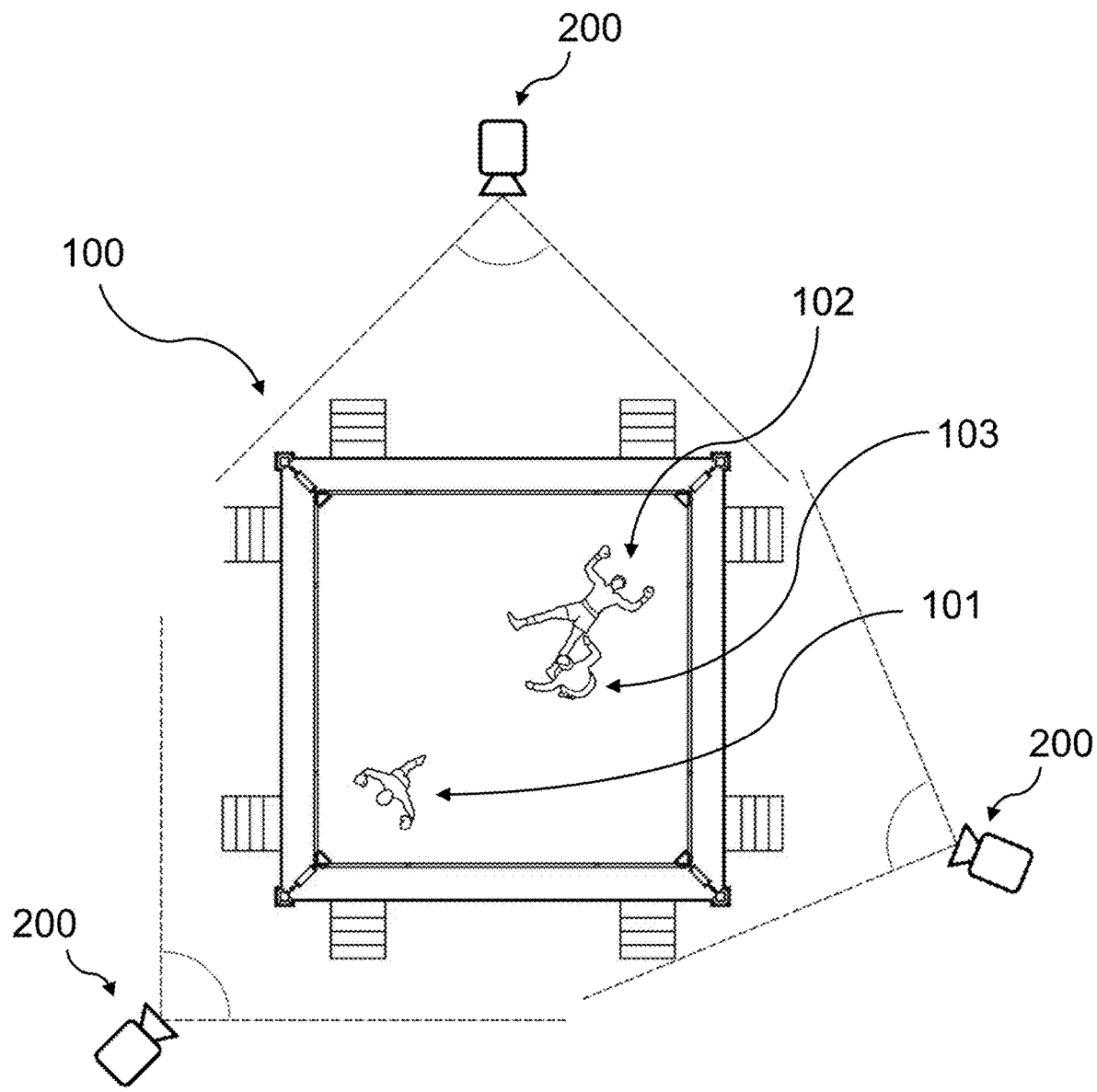
FIG. 1 is a schematic top view of a boxing ring where a method according to embodiments of the present invention is performed.

FIG. 1 schematically illustrates a combat sports event 100, in particular a boxing match in a boxing ring where a first combatant 101 and a second combatant 102 perform a combat. In the boxing ring, a referee 103 is located. Around the boxing ring, three video cameras 200 are positioned at different viewpoints to capture video sequences 201. In particular, each of the video cameras 200 provides a respective video sequence 201. This can for example be a continuous video stream in real-time.

Performing one particular exemplary embodiment of the method according to the present invention for automated video production, initially, three video sequences 201 are captured by respective video cameras 200. The three video sequences 201 are received by a processing entity, e.g., by a data processing apparatus which is configured to perform the method according to embodiments of the present invention. Based on the processing step, a desired output video sequence 300 may be generated. The processing step is described in further detail in the following.

Processing the video sequences 201 may comprise determining, by an object detection algorithm, at least one region of interest 202 in the video sequence 201, wherein the at least one region of interest 202 is associated with one of the first or second combatants 101, 102 of the combat sports event 100, preferably with at least one body part of the first or second combatant 101, 102. Determining the at least one region of interest 202 may be performed automatically, in particular based on a machine learning model, as described in detail above.

Further, processing the video sequences 201 may comprise determining a quality-of-view indicator of the at least one determined region of interest 202 in the video sequence 201 based at least in part on a positional relationship between the first combatant 101 and the second combatant 102 of the combat sports event 100. Determining the quality-of-view indicator may be performed automatically, in particular based on a machine learning model, as described in detail above.

Examples for regions of interest may include the first or second combatant or their body parts, in particular their fist, forearm, elbow, foot, shin, knee, head, torso, shoulder and/or hip. Further, a region of interest may be an image section being equal to an entire video sequence captured by a video camera and/or may be a virtual camera view constructed from other region of interests in combination.

Steps of the method according to embodiments of the present invention are preferably performed by a plurality of machine learning models, in particular separately operated and/or trained machine learning models. In embodiments of the present invention, performing the method includes utilizing a sequence of at least two machine learning models. Alternatively or additionally, performing the method according to embodiments of the present invention includes utilizing at least three machine learning models, wherein outputs of at least two of the at least three machine learning models are used as inputs for at least one of the at least three machine learning models, thus creating kind of a tree structure of machine learning models. Each of the machine learning models may be adapted to their specific task, i.e., being trained to perform their task in an optimal manner.

Alternatively, according to embodiments of the present invention, the method may be performed by one singe machine-learning model configured to perform processing of video sequences 201 and to generate the output video sequence 300.

Prior to processing the video sequences 201, preprocessing one or more of the three captured video sequences 201 may be performed for reducing the processing load that is needed for performing processing. It is preferred that preprocessing is performed based on a preprocessing machine learning model that may be one of the above-mentioned plurality of machine learning models. In embodiments of the present invention, preprocessing can include splitting the video sequences 201 with respect to time sections and/or cropping the video sequences 201 with respect to image sections. Alternatively or additionally, preprocessing may include filtering out noise, adjusting lighting or contrast, masking and/or padding irrelevant sections of the video sequences 201, introducing labels to video sequences 201, marking sections of video sequences 201 as sections of main combat actions, and/or reducing the resolution or frame rate for simplicity. These adjustments assist in reducing redundant and/or irrelevant information, thus streamlining the input that will be processed by the subsequent stages of the method in order to, for example, reduce the need for processing resources.

In embodiments of the present invention, automatically determining the quality-of-view indicator is performed based on an evaluation machine learning model. Said evaluation machine learning model may be one of the above-mentioned plurality of machine learning models. Further, automatically determining a quality-of-view indicator may be performed based on and/or considering a viewpoint of a respective video camera 200 and/or based on relative positional aspects of the combatants 101, 102 and optionally the referee 103.

Additionally or alternatively, further relative positional aspects, as discussed in detail above, may be considered, for example relative positional aspects between body parts of a combatant 101, 102 and/or relative positional aspects with respect to the referee 103 and/or relative positional aspects with respect to the viewpoint(s) of video camera(s). The viewpoint can be the location of a respective video camera 200 relative to the combat sports event, i.e., the ring in case of a combat sports type carried out in a ring. Further, the viewpoint may include a respective angle of view, more preferably a respective zoom factor and/or further settings of the respective video camera 200. Thus, in other words, the viewpoint of a video camera 200 may include positioning and orientation of a respective video camera 200 and optionally other settings of the respective video camera 200.

In embodiments of the present invention, the method may include generating the output video sequence 300 including determining a viewpoint of a virtual camera based on which the output video sequence 300 is generated. Determining the viewpoint of the virtual camera may be performed based on a viewpoint machine learning model that may be one of the above-mentioned plurality of machine learning models. Alternatively or additionally, determining the viewpoint of the virtual camera may include selecting one of the viewpoints of the plurality of video sequences 201 based at least in part on the determined quality-of-view indicators. Alternatively or additionally, determining the viewpoint of the virtual camera may include performing a zoom-in operation or a zoom-out operation, in particular on one or more of the at least one video sequence 201. Alternatively or additionally, determining the viewpoint of the virtual camera may include performing a crop operation, in particular on one or more of the at least one video sequences 201. Alternatively or additionally, determining the viewpoint of the virtual camera may include adjusting settings of one of the video cameras 200.

Regarding the output video sequence 300 that is generated by embodiments of the present invention, the output video sequence 300 may include highlight scenes of the combat sports event and/or statistics of the combat sports event. The highlight scenes and/or statistics may be selected based on individual viewer preferences that may preferably be set by viewers, e.g., by providing viewer input to a frontend device which may be in particular capable of displaying the generated output video sequence 300. Prior to generating the output video sequence 300, determining highlight scene proposals may be performed. This may include detecting actions such as punches, kicks, take-downs. Determining highlight scene proposals may be, in embodiments of the present invention, performed based on a machine learning model which may be one of the above-mentioned plurality of machine learning models. Alternatively or additionally, highlight scene proposals are rated based on user preferences, wherein a selection of highlight scenes is performed. This may be performed by means of the above-mentioned machine learning model. Additionally or alternatively, generating the output video sequence 300 may include at least part of the determined statistics and proposed highlight scenes. The proposed and selected highlight scenes may be included in the output video sequence 300 as overlay graphics, in particular during breaks of the combat sports event 100. The proposed and selected statistics may be included in the output video sequence 300 as overlay information, in particular during breaks of the combat sports event 100.

Figure 2:
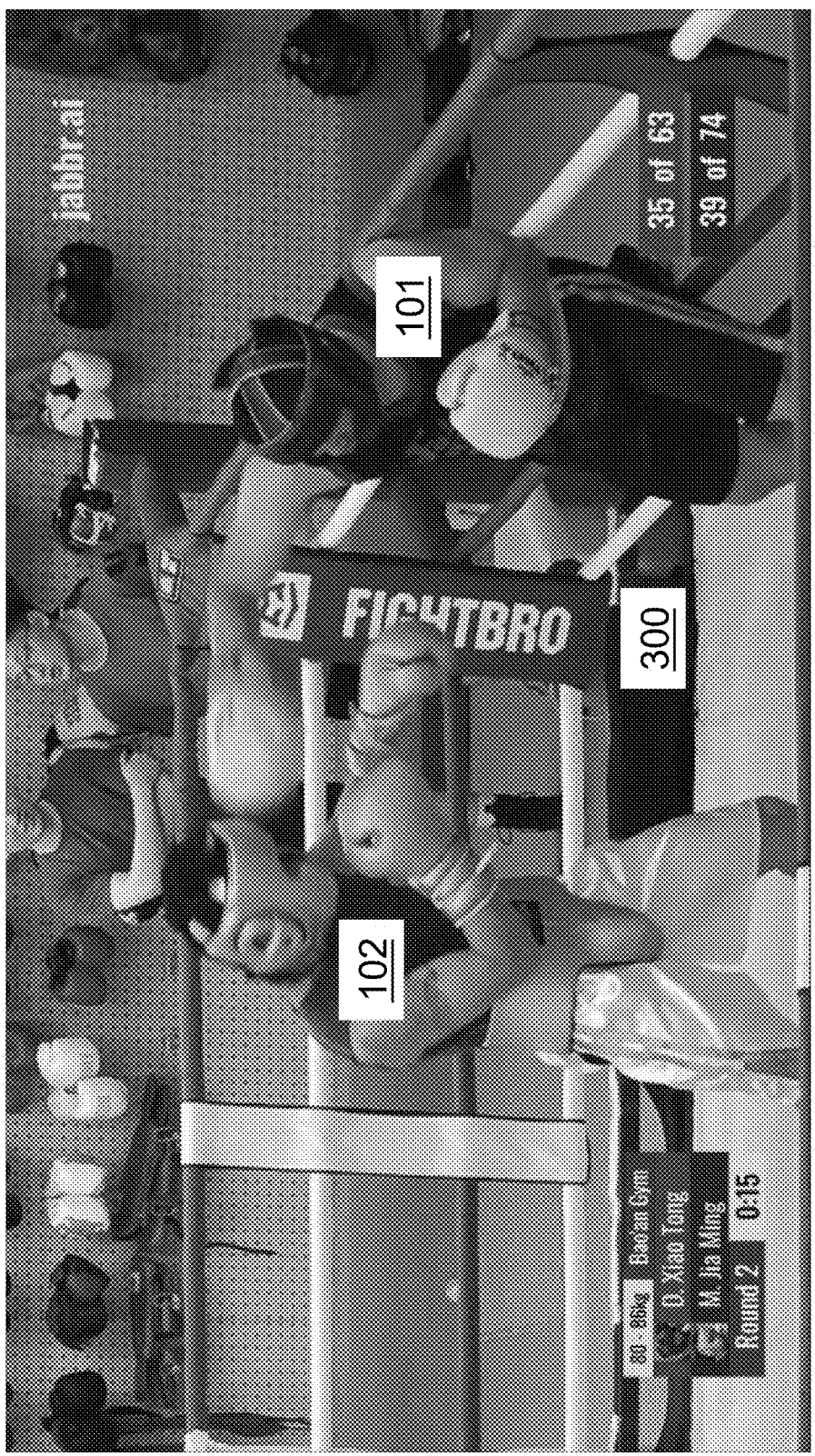
FIG. 2 shows an exemplary snapshot of an output video sequence according to embodiments of the present invention.
Figure 3:
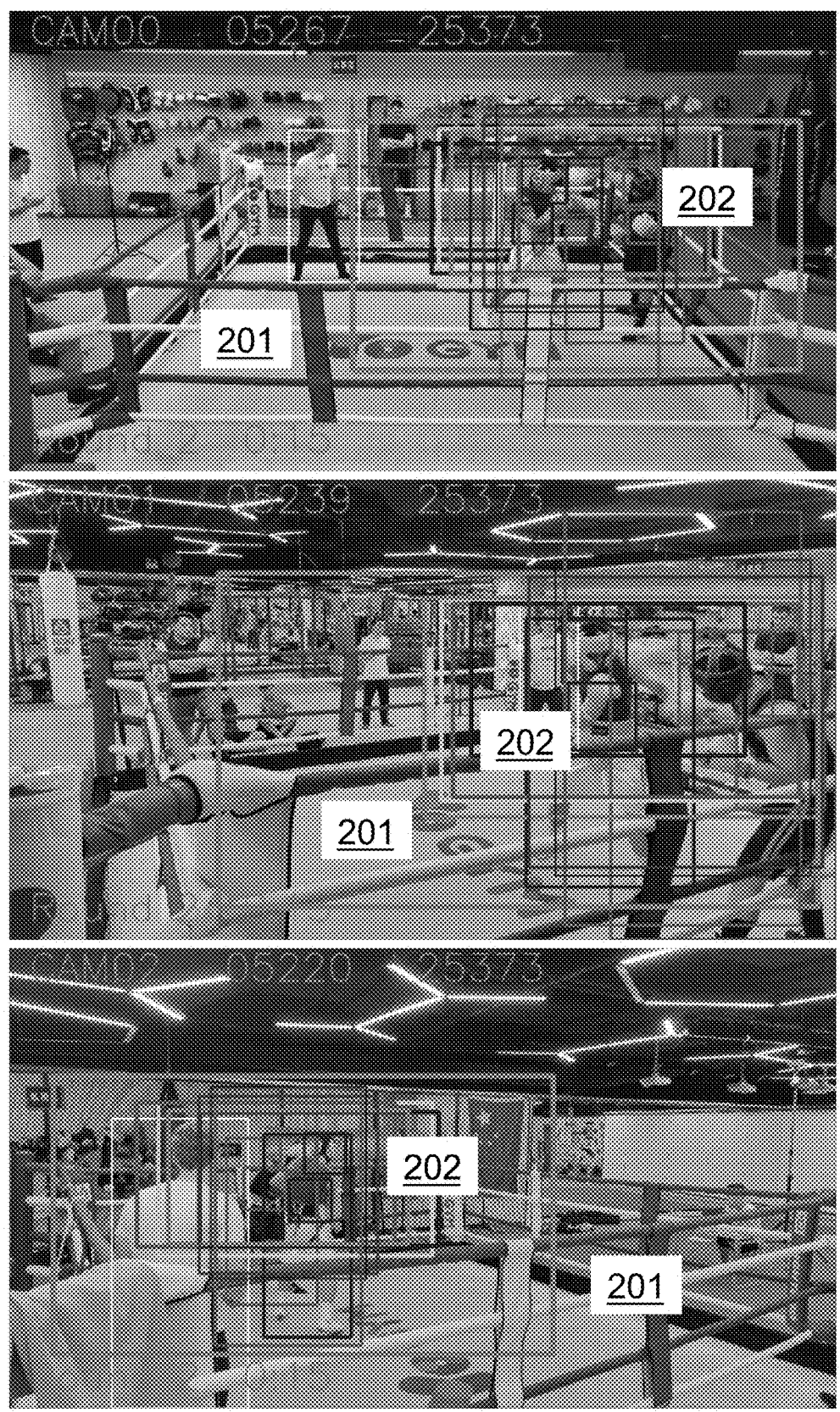
FIG. 3 shows three exemplary snapshots of input video sequences according to embodiments of the present invention.
Figure 4:
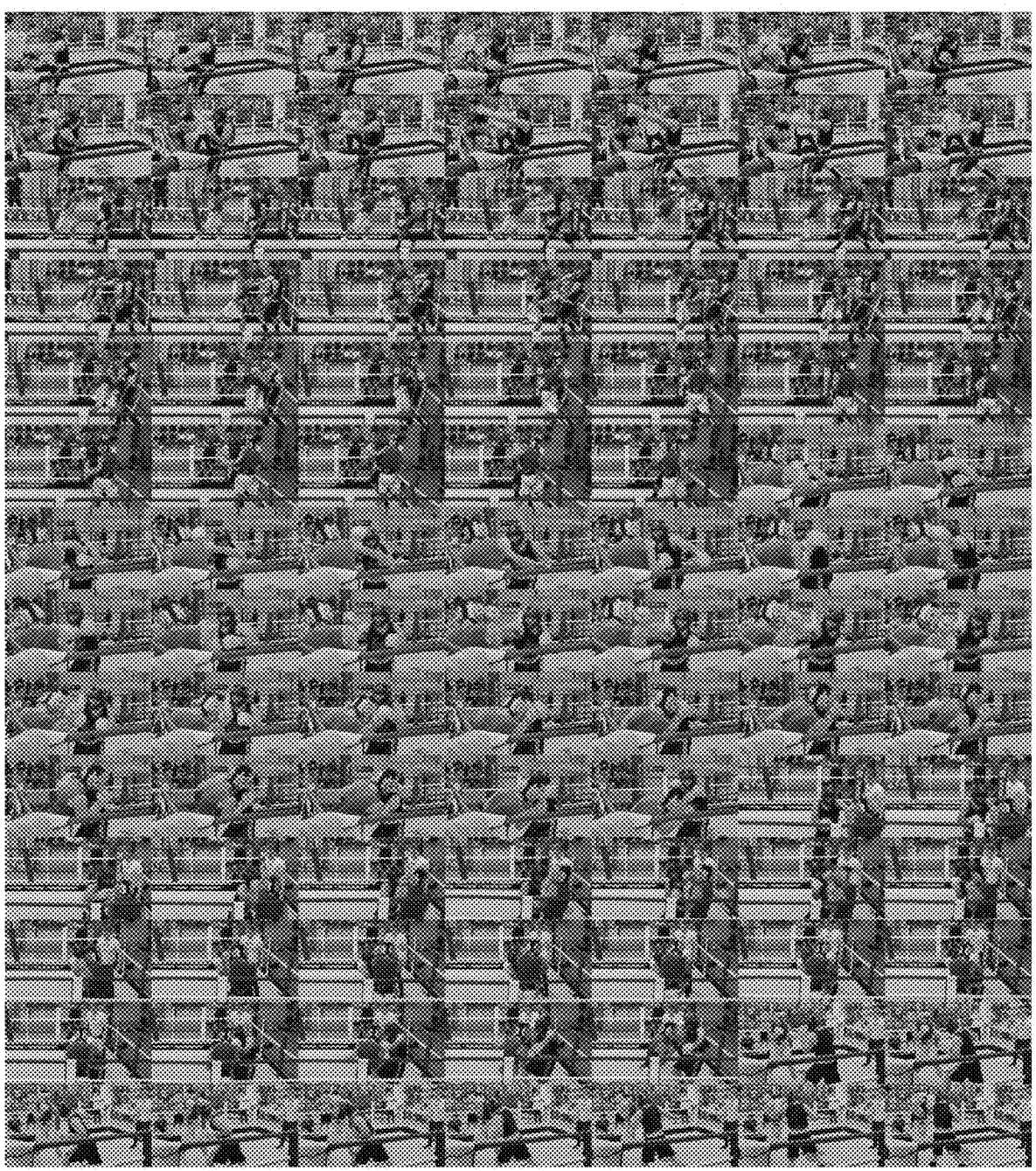
FIG. 4 shows consecutive in-memory frames of a set of combat event highlights being prepared according to embodiments of the present invention.

In FIG. 2, an exemplary output video scene 300 is illustrated. As can be seen in said figure, a first combatant 201 and a second combatant 202 are performing a boxing event. In FIG. 3, the above-mentioned three video sequences 201 from the three video cameras 200 are illustrated. The video sequences 201 may preferably be preprocessed adding labelling information for facilitating smooth and efficient further processing. Further, as can be seen in the figure, regions of interest 202 are marked by bounding boxes that are observed. In FIG. 4, a set of proposed highlight scenes is illustrated.

Figure 5A:
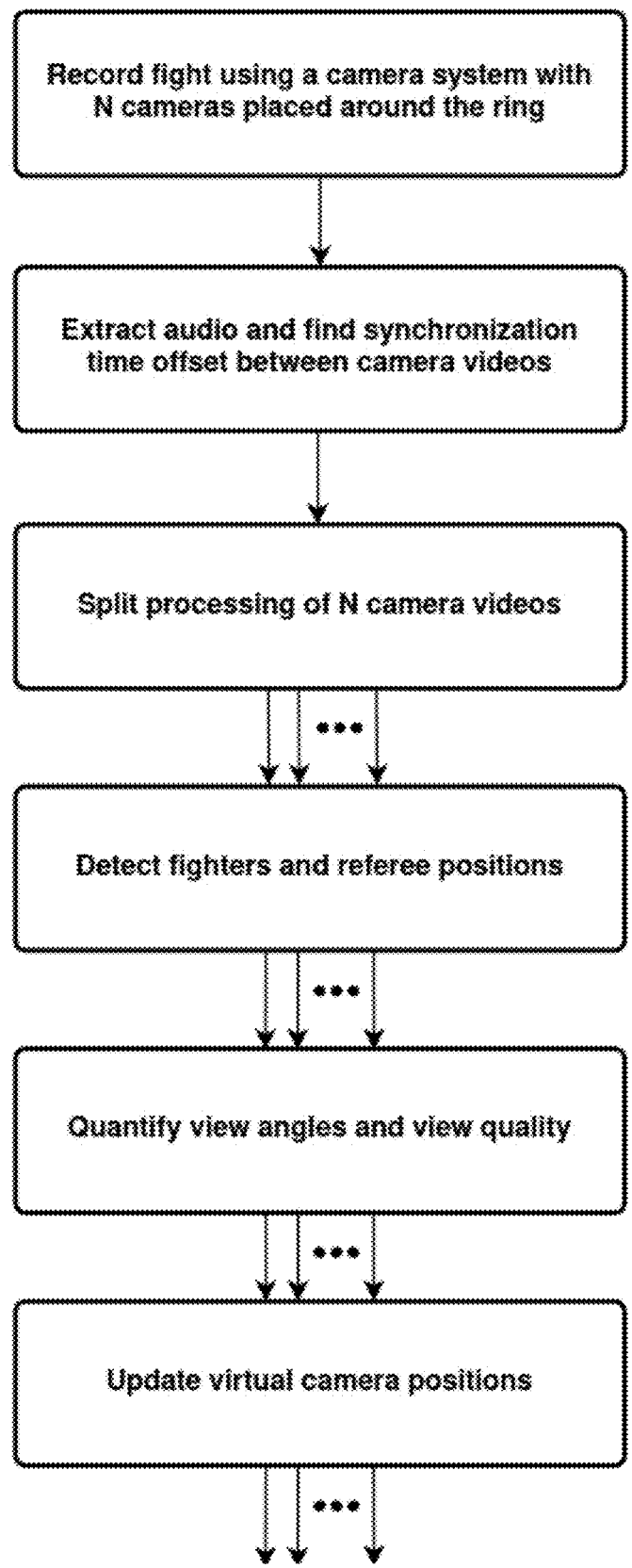
FIG. 5a is a first part of a first flowchart including steps revealing aspects of the present invention in different words.
Figure 5B:
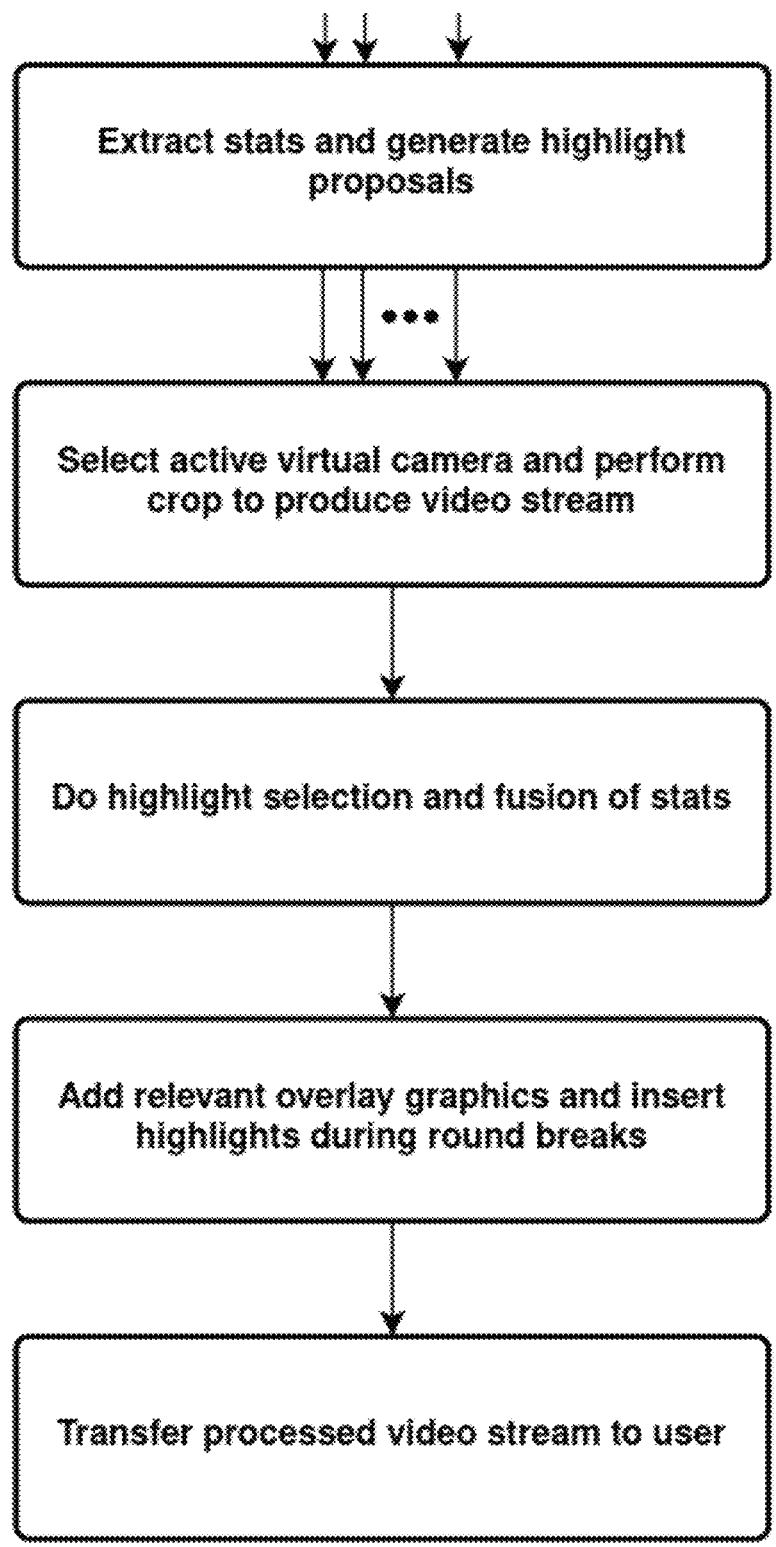
FIG. 5b is a second part of a first flowchart including steps revealing aspects of the present invention in different words.

FIGS. 5*a* and 5*b* show a flowchart explaining one embodiment of the present invention in different words. First of all, "record fight using a camera system with N cameras places around the ring" is performed. Then, "Extract audio and find synchronization time offset between camera videos" is performed. Then, "Split processing of N camera videos" is performed. Then, "Detect fighters and referee positions" is performed. Then, "Quantify view angles and view quality" is performed. Then, "Update virtual camera positions" is performed. Then, "Extract stats and generate highlight proposals" is performed. Then, "Select active virtual camera and perform crop to produce video stream" is performed. Then, "Do highlight selection and fusion of stats" is performed. Then, "Add relevant overlay graphics and insert highlights during round breaks" is performed. Then, "Transfer processed video stream to user" is performed.

Figure 6:
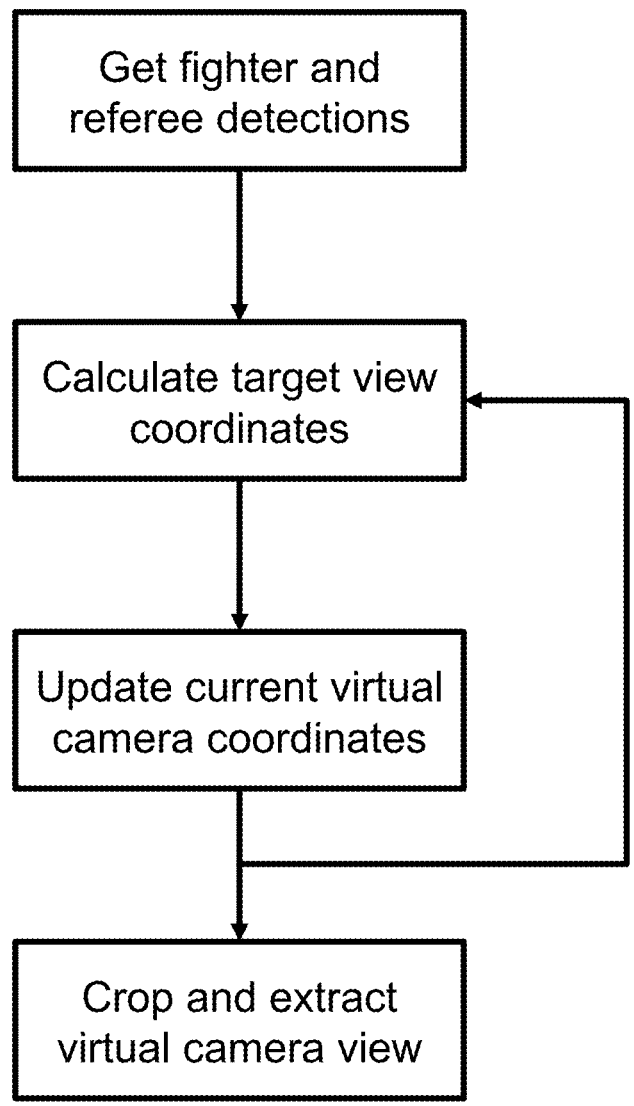
FIG. 6 is a second flowchart including steps revealing aspects of the present invention in different words.

FIG. 6 shows a flowchart describing parts of embodiments of the present invention in different words. The figure relates to a process of updating a virtual camera viewpoint in an embodiment of the present invention. The flowchart includes the step of "Get fighter and referee detections". Further, the flowchart includes the step of "Calculate target view coordinated". Further, the flowchart includes the step of "Update current virtual camera coordinates". Further, the flowchart includes the step of "Crop and extract virtual camera view".

Figure 7A:
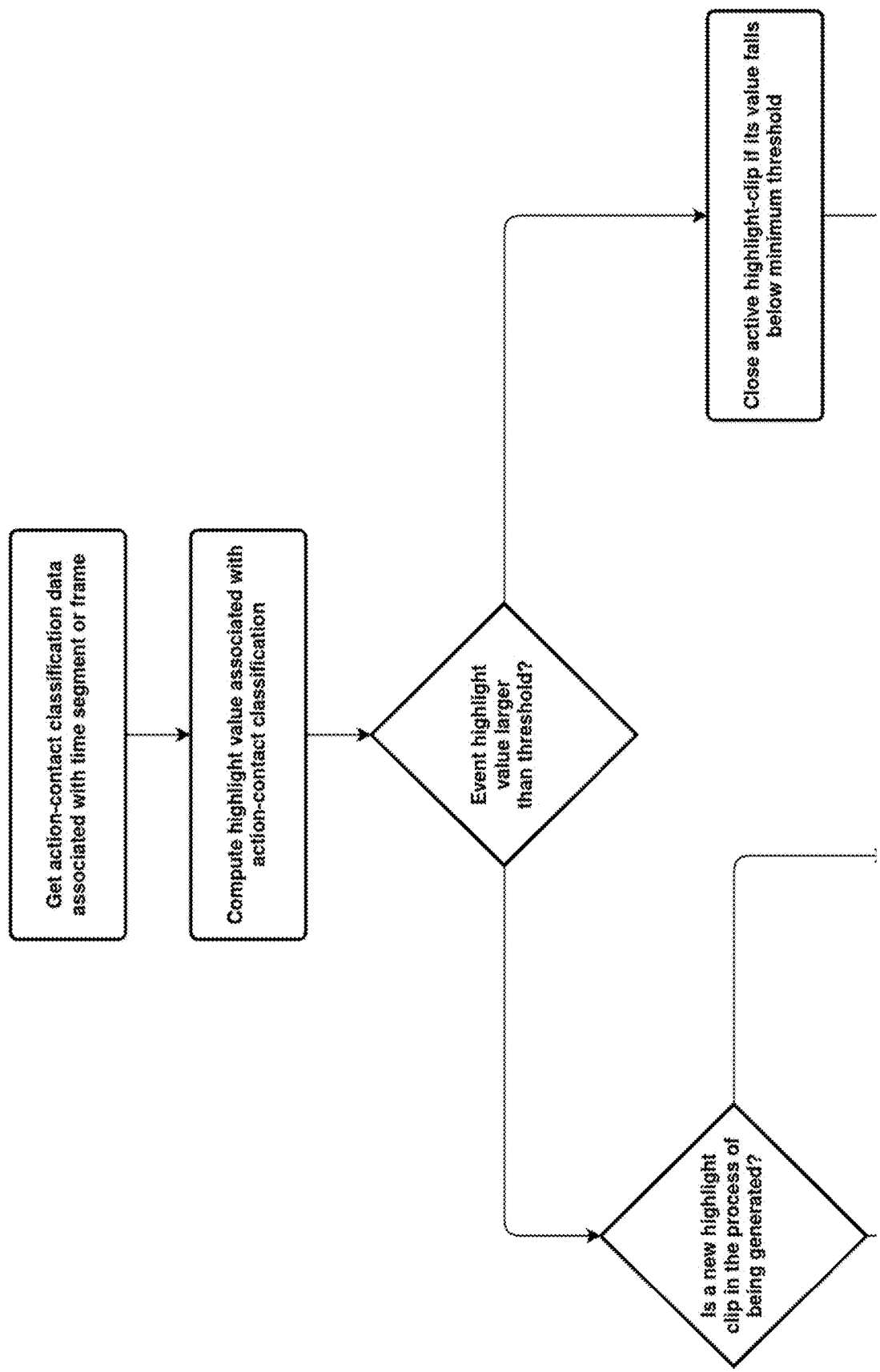
FIG. 7a is a first part of a third flowchart including steps revealing aspects of the present invention in different words.
Figure 7B:
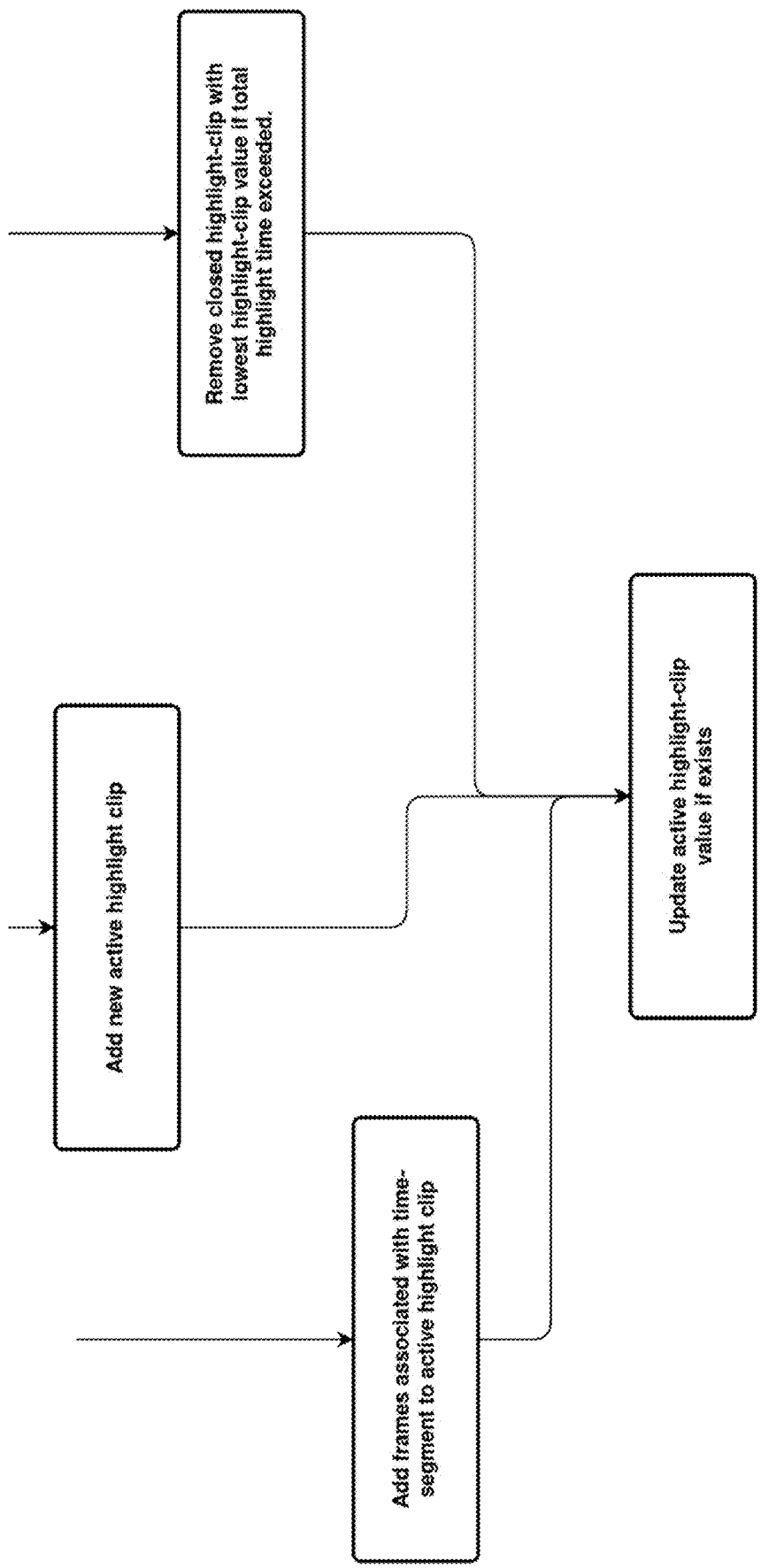
FIG. 7b is a second part of a third flowchart including steps revealing aspects of the present invention in different words.

FIGS. 7*a* and 7*b* include a flowchart describing parts of embodiments of the present invention in different words, including in particular a live real-time generation of round highlights. With respect to the content of the flowchart, reference is made to the figures for the sake of clarity because the flowchart comprises several ramifications that cannot be reflected concisely in text form.

With respect to the different wording of FIGS. 5a, 5b, 6, 7a and 7b, the following expressions may be understood as follows: The expression "fight" may be understood as species to the generic expression "combat sports event". The expression "camera system" may be understood as species to the generic expression "at least one video camera". The expression "camera" may be understood as genus expression to the species expression "video camera". The expressions "camera video" and "clip" may be understood as species to the generic expression "video sequence and/or output video sequence". The expression "fighter" may be understood as species to the generic expression "combatant". The expression "view angle" and "view quality" may be understood as species expressions in the context of the above-described generic expression "quality-of-view indicator". The expressions "camera position" and "view" may be understood as species to the generic expression "viewpoint". The expression "stats" may be understood as an abbreviation of the expression "statistics". The expression "video stream" may be understood as species to the generic expression "output video sequence". The expression "target view" may be understood as species to the generic expression "viewpoint of a video camera and/or virtual camera".

Certain embodiments of the invention may be based on using a machine learning model or machine learning algorithm. Machine learning may refer to algorithms and statistical models that computer systems may use to perform a specific task without using explicit instructions, instead relying on models and inference. For example, in machine learning, instead of a rule-based transformation of data, a transformation of data may be used that is inferred from an analysis of historical and/or training data. For example, the content of images may be analyzed using a machine learning model or using a machine learning algorithm. In order for the machine learning model to analyze the content of an image, the machine learning model may be trained using training images as input and training content information as output. By training the machine learning model with a large number of training images and/or training sequences (e.g. words or sentences) and associated training content information (e.g. labels or annotations), the machine learning model "learns" to recognize the content of the images, so the content of images that are not included in the training data can be recognized using the machine learning model. The same principle may be used for other kinds of sensor data as well: By training a machine learning model using training sensor data and a desired output, the machine learning model "learns" a transformation between the sensor data and the output, which can be used to provide an output based on non-training sensor data provided to the machine learning model. The provided data (e.g., sensor data, meta data and/or image data) may be preprocessed to obtain a feature vector, which is used as input to the machine learning model.

Machine learning models may be trained using training input data. The examples specified above use a training method called "supervised learning". In supervised learning, the machine learning model is trained using a plurality of training samples, wherein each sample may comprise a plurality of input data values, and a plurality of desired output values, i.e., each training sample is associated with a desired output value. By specifying both training samples and desired output values, the machine learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g., a classification algorithm, a regression algorithm or a similarity learning algorithm). Classification algorithms may be used when the outputs are restricted to a limited set of values (categorical variables), i.e., the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters. Reinforcement learning is a third group of machine learning algorithms that may be used to train the machine learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine learning algorithms. For example, feature learning may be used. In other words, the machine learning model may at least partially be trained using feature learning, and/or the machine learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e., outlier detection) may be used, which is aimed at providing an identification of input values that raise suspicions by differing significantly from the majority of input or training data. In other words, the machine learning model may at least partially be trained using anomaly detection, and/or the machine learning algorithm may comprise an anomaly detection component.

In some examples, the machine learning algorithm may use a decision tree as a predictive model. In other words, the machine learning model may be based on a decision tree. In a decision tree, observations about an item (e.g., a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine learning algorithms. In other words, the machine learning model may be based on one or more association rules. Association rules are created by identifying relationships between variables in large amounts of data. The machine learning algorithm may identify and/or utilize one or more relational rules that represent the knowledge that is derived from the data. The rules may e.g. be used to store, manipulate or apply the knowledge.

Machine learning algorithms are usually based on a machine learning model. In other words, the term "machine learning algorithm" may denote a set of instructions that may be used to create, train or use a machine learning model. The term "machine learning model" may denote a data structure and/or set of rules that represents the learned knowledge (e.g., based on the training performed by the machine learning algorithm). In embodiments, the usage of a machine learning algorithm may imply the usage of an underlying machine learning model (or of a plurality of underlying machine learning models). The usage of a machine learning model may imply that the machine learning model and/or the data structure/set of rules that is the machine learning model is trained by a machine learning algorithm.

For example, the machine learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g., of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine learning model may be a support vector machine, a random forest model or a gradient boosting model. Support vector machines (i.e., support vector networks) are supervised learning models with associated learning algorithms that may be used to analyze data (e.g., in classification or regression analysis). Support vector machines may be trained by providing an input with a plurality of training input values that belong to one of two categories. The support vector machine may be trained to assign a new input value to one of the two categories. Alternatively, the machine learning model may be a Bayesian network, which is a probabilistic directed acyclic graphical model. A Bayesian network may represent a set of random variables and their conditional dependencies using a directed acyclic graph. Alternatively, the machine learning model may be based on a genetic algorithm, which is a search algorithm and heuristic technique that mimics the process of natural selection.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some or all of the method steps may be executed by (or using) a hardware apparatus, such as a processor, a microprocessor, a programmable computer or an electronic circuit. Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments of the invention provide a data carrier having electronically readable control signals, which are capable of cooperating with a programmable computer system, such that one of the methods described herein is performed.

Generally, embodiments of the invention can be implemented as a computer program (product) with a program code, the program code being operative for performing one of the methods when the computer program product runs on a computer. The program code may, for example, be stored on a machine-readable carrier. Other embodiments comprise the computer program for performing one of the methods described herein, stored on a machine-readable carrier. In other words, an embodiment of the present invention is, therefore, a computer program having a program code for performing one of the methods described herein, when the computer program runs on a computer.

A further embodiment of the invention provides a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention provides a data stream or a sequence of signals representing the computer program for performing one of the methods described herein. The data stream or the sequence of signals may, for example, be configured to be transferred via a data communication connection, for example, via the internet.

A further embodiment of the invention provides a processing means, for example, a computer or a programmable logic device, configured to, or adapted to, perform one of the methods described herein.

A further embodiment of the invention provides a computer having installed thereon the computer program for performing one of the methods described herein.

A further embodiment of the invention provides an apparatus or a system configured to transfer (e.g., electronically or optically) a computer program for performing one of the methods described herein to a receiver. The receiver may, for example, be a computer, a mobile device, a memory device, or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

REFERENCE SIGNS 100 combat sport[s] event
101 first combatant
102 second combatant
103 referee
200 video camera[s]
201 video sequence[s]
202 region[s] of interest
300 output video sequence[s]

The invention claimed is:

1. A computer-implemented method of automated video production for combat sports events, the method comprising:
   receiving at least one input video sequence of a combat sports event captured by at least one video camera;
   processing the at least one video sequence, including:
      automatically determining, by an object detection algorithm comprising a machine learning based object detection algorithm, at least one region of interest in the video sequence, wherein the at least one region of interest is associated with at least one body part of a first combatant; and
      automatically determining a quality-of-view indicator of the at least one determined region of interest in the video sequence based at least in part on a positional relationship between the first combatant and a second combatant of the combat sports event;
   determining highlight scene proposals based on detecting actions such as punches, kicks, and/or take-downs and based on a relevance evaluation thereof by tagging each of the highlight scene proposals within the at least one input video sequence as one or more prioritized sequences of the actions; and
   generating an output video sequence based at least in part on the determined quality-of-view indicators and including at least part of the highlight scene proposals.

2. The computer-implemented method of claim 1, wherein the at least one input video sequence is a plurality of input video sequences, and wherein the processing is performed on each of the plurality of video sequences, and wherein preferably the plurality of input video sequences is captured by a plurality of video cameras.

3. The computer-implemented method of claim 1, wherein the method is performed based on a plurality of machine learning models, wherein
   performing the method includes utilizing a sequence of at least two machine learning models, and/or
   wherein performing the method includes utilizing at least three machine learning models, wherein outputs of at least two of the at least three machine learning models are used as inputs for at least one of the at least three machine learning models.

4. The computer-implemented method of claim 1, wherein automatically determining at least one region of interest is performed based on a determining machine learning model.

5. The computer-implemented method of claim 1, wherein prior to processing the at least one video sequence, preprocessing one or more of the at least one video sequence is performed for reducing the processing load that is needed for performing the processing, wherein preferably the preprocessing is performed based on a preprocessing machine learning model.

6. The computer-implemented method of claim 5, wherein the preprocessing includes splitting the at least one video sequence with respect to time sections and/or cropping the at least one video sequence with respect to image sections.

7. The computer-implemented method of claim 1, wherein the automatically determining of the quality-of-view indicator is performed based on an evaluation machine learning model.

8. The computer-implemented method of claim 1, wherein the automatically determining of a quality-of-view indicator is performed under consideration of a viewpoint of a respective video camera and/or based on relative positional aspects of the combatants and optionally a referee.

9. The computer-implemented method of claim 1, wherein the generating of the output video sequence includes determining a viewpoint of a virtual camera based on which the output video sequence is generated, wherein the determining of the viewpoint of the virtual camera is preferably performed based on a viewpoint machine learning model, and/or wherein the determining of the viewpoint of the virtual camera includes one or more of the following:
   selecting one of the viewpoints of the plurality of video sequences based at least in part on the determined quality-of-view indicators,
   performing a zoom-in operation or a zoom-out operation, in particular on one or more of the at least one video sequence,
   performing a crop operation, in particular on one or more of the at least one video sequences.

10. The computer-implemented method of claim 1, wherein the highlight scene proposals are rated based on user preferences, wherein for generating the output video sequence, a selection of highlight scenes is performed.

11. The computer-implemented method of claim 1, wherein the output video sequence includes at least part of proposed highlight scenes and optionally determined statistics of the combat sports event, wherein the proposed highlight scenes are included in the output video sequence as overlay graphics, in particular during breaks of the combat sports event.

12. The computer-implemented method of claim 1, wherein the output video sequence includes at least part of proposed highlight scenes and optionally determined statistics of the combat sports event, wherein the proposed highlight scenes are included in the output video sequence as overlay graphics, in particular during breaks of the combat sports event.

13. The computer-implemented method of claim 1, wherein generating the output video sequence based at least in part on the determined quality-of-view indicators further comprises using an output of at least one machine learning model as an input for at least one other machine learning model.

14. A data processing apparatus comprising:
   a processor;
   a computer memory accessible by the processor;
   a machine learning based object detection algorithm stored in the computer memory; and
   a computer program stored in the computer memory and configured to access or implement the machine learning based object detection algorithm, wherein the computer program, when executed by the processor, causes the processor to:

receive at least one input video sequence of a combat sports event captured by at least one video camera;

process the at least one video sequence, including:

automatically determining, by an object detection algorithm comprising the machine learning based object detection algorithm, at least one region of interest in the video sequence, wherein the at least one region of interest is associated with at least one body part of a first combatant; and automatically determining a quality-of-view indicator of the at least one determined region of interest in the video sequence based at least in part on a positional relationship between the first combatant and a second combatant of the combat sports event;

determining highlight scene proposals based on detecting actions such as punches, kicks, and/or take-downs and based on a relevance evaluation thereof by tagging each of the highlight scene proposals within the at least one input video sequence as one or more prioritized sequences of the actions; and generate an output video sequence based at least in part on the determined quality-of-view indicators and including at least part of the highlight scene proposals.

15. A non-transitory computer-readable medium having stored thereon a computer program, the computer program comprising instructions which, when the program is executed by a computer, cause the computer to:

receive at least one input video sequence of a combat sports event captured by at least one video camera;

process the at least one video sequence, including:

automatically determining, by an object detection algorithm comprising a machine learning based object detection algorithm, at least one region of interest in the video sequence, wherein the at least one region of interest is associated with at least one body part of a first combatant; and automatically determining a quality-of-view indicator of the at least one determined region of interest in the video sequence based at least in part on a positional relationship between the first combatant and a second combatant of the combat sports event;

determining highlight scene proposals based on detecting actions such as punches, kicks, and/or take-downs and based on a relevance evaluation thereof by tagging each of the highlight scene proposals within the at least one input video sequence as one or more prioritized sequences of the actions; and generate an output video sequence based at least in part on the determined quality-of-view indicators and including at least part of the highlight scene proposals.

\* \* \* \* \*